US007965263B2

(12) United States Patent
Parikh et al.

(10) Patent No.: US 7,965,263 B2

(45) Date of Patent: Jun. 21, 2011

(54) DISPLAY DEVICE AND DRIVING METHOD THEREOF

(75) Inventors: Kunjal Parikh, Yongin (KR); Kyuha Chung, Seoul (KR); Nam-Deog Kim, Yongin-si (KR); Beohm-Rock Choi, Seoul (KR); Joon-Chul Goh, Seoul (KR); Joon-Hoo Choi, Seoul (KR)

(73) Assignee: Samsung Electronics Co., Ltd. (KR)

( * ) Notice: Subject to any disclaimer, the term of this patent is extended or adjusted under 35 U.S.C. 154(b) by 916 days.

(21) Appl. No.: 11/696,309

(22) Filed: Apr. 4, 2007

(65) Prior Publication Data

US 2008/0094320 A1 Apr. 24, 2008

Related U.S. Application Data

(60) Provisional application No. 60/791,767, filed on Apr. 12, 2006.

(30) Foreign Application Priority Data

Apr. 4, 2006 (KR) ........................ 10-2006-0030401

(51) Int. Cl.

| | |
|---|---|
| ***G06F 3/038*** | (2006.01) |
| ***G09G 3/30*** | (2006.01) |
| ***G09G 5/00*** | (2006.01) |
| ***G09G 3/10*** | (2006.01) |

(52) U.S. Cl. ............ 345/76; 345/77; 345/208; 345/209; 315/169.3

(58) Field of Classification Search .............. 345/76–83, 345/208–209; 315/169.3

See application file for complete search history.

(56) References Cited

U.S. PATENT DOCUMENTS

| | | | | |
|---|---|---|---|---|
| 5,552,678 | A * | 9/1996 | Tang et al. | 315/169.3 |
| 5,627,556 | A | 5/1997 | Kwon et al. | |
| 5,844,538 | A * | 12/1998 | Shiraki et al. | 345/98 |
| 6,731,276 | B1 * | 5/2004 | Ishizuka | 345/211 |
| 6,809,481 | B2 * | 10/2004 | Seo et al. | 315/169.1 |
| 7,034,339 | B2 * | 4/2006 | Matsuura et al. | 257/79 |
| 7,742,025 | B2 * | 6/2010 | Sung et al. | 345/82 |
| 2003/0112205 | A1 * | 6/2003 | Yamada | 345/32 |
| 2003/0210212 | A1 | 11/2003 | Li et al. | |
| 2004/0051469 | A1 * | 3/2004 | Ha et al. | 315/169.3 |
| 2004/0252089 | A1 * | 12/2004 | Ono et al. | 345/82 |
| 2006/0007072 | A1 | 1/2006 | Choi et al. | |

(Continued)

FOREIGN PATENT DOCUMENTS

JP 07-175441 7/1995

(Continued)

OTHER PUBLICATIONS

English Language Abstract, KR Patent First Publication No. 10-2004-0100889, Dec. 2, 2004, 2 pages.

(Continued)

*Primary Examiner* — Bipin Shalwala
*Assistant Examiner* — Ilana Spar
(74) *Attorney, Agent, or Firm* — Innovation Counsel LLP

(57) ABSTRACT

A display device and a method of driving the same, win which the display device includes a light emitting element and a driving transistor supplying a driving current to the light emitting element, and in which one of a data voltage or a reverse bias voltage is applied to the driving transistor in an alternating manner, and the reverse bias voltage is an AC voltage.

25 Claims, 10 Drawing Sheets

U.S. PATENT DOCUMENTS

| | | | | |
|---|---|---|---|---|
| 2006/0012587 | A1 | 1/2006 | Stevenson et al. | |
| 2006/0187154 | A1* | 8/2006 | Tsuchida | 345/76 |

FOREIGN PATENT DOCUMENTS

| | | | |
|---|---|---|---|
| JP | 11-003060 | | 1/1999 |
| JP | 2005-346055 | | 12/1999 |
| JP | 2003150082 | A | 5/2003 |
| KR | 1996-0016720 | | 12/1996 |
| KR | 10-2004-0063111 | | 7/2004 |
| KR | 10-2004-0074601 | | 8/2004 |
| KR | 10-2004-0100889 | | 12/2004 |
| KR | 10-2005-0060953 | | 6/2005 |
| KR | 10-2005-0061321 | | 6/2005 |
| KR | 10-0528692 | | 11/2005 |
| KR | 10-2005-0115346 | | 12/2005 |
| WO | WO 94/25954 | | 11/1994 |
| WO | WO 03/050892 | A1 | 6/2003 |

OTHER PUBLICATIONS

English Language Abstract, KR Patent First Publication No. 10-2005-0060953, Jun. 22, 2005, 1 page.

English Language Abstract, KR Patent First Publication No. 10-2005-0061321, Jun. 22, 2005, 2 pages.

English Language Abstract, KR Patent First Publication No. 10-2005-0115346, Dec. 7, 2005, 2 pages.

English Language Abstract, JP Patent First Publication No. 07-175441, Jul. 14, 1995, 1 page.

English Language Abstract, JP Patent First Publication No. 11-003060, Jan. 6, 1999, 1 page.

English Language Abstract, JP Patent First Publication No. 2005-346055, Dec. 15, 1999, 1 page.

Search Report corresponding to EP 07006618.8-2205/1843316, Mar. 11, 2009, 7 pp.

* cited by examiner

DISPLAY DEVICE AND DRIVING METHOD THEREOF

CROSS-REFERENCE TO RELATED APPLICATION

This application claims priority to and the benefit of Korean Patent Application No. 10-2006-0030401 filed in the Korean Intellectual Property Office on Apr. 4, 2006, and the provisional Patent Application No. 60/791,767 filed on Apr. 12, 2006, the entire contents of which are incorporated herein by reference.

BACKGROUND OF THE INVENTION

1. Field of the Invention

The present invention relates to a display device and a driving method thereof. More particularly, the present invention relates to an organic light emitting diode (OLED) display and a driving method thereof.

2. Description of the Related Art

Recently, there has been an increasing demand for lightweight and thin display devices as personal computers and televisions have been designed so as to be lightweight and thin. In response to this demand, traditional cathode ray tubes (CRT) are being replaced by a flat panel display device.

Such flat display panel display devices include a liquid crystal display (LCD), a field emission display (FED), an organic light emitting diode (OLED) display, a plasma display panel (PDP), etc.

In general, an active matrix type of flat panel display device includes a large number of pixels arranged in a matrix, and controls light intensity for each pixel in accordance with given luminance information to display images. Among them, the OLED display device displays images by electrical excitation and emission of self-emitting organic phosphors. Relative to other flat panel displays, the OLED display exhibits low power consumption, wide viewing angles, and high pixel response speeds, thus making it easier to display high quality motion pictures.

The OLED display includes an organic light emitting diode (OLED) and a thin film transistor (TFT) for driving the OLED. The TFT is classified according to the type of active layer, for example, into a polycrystalline silicon (polysilicon) TFT or an amorphous silicon (a-Si) TFT. Although the various advantages of using the polysilicon TFT has led to the widespread use of OLED displays, the polysilicon TFT fabrication process can be complex and costly. Moreover, it is difficult to obtain a large screen with such OLED displays.

In comparison to a polysilicon TFT, fewer steps are required to fabricate an a-Si TFT, and a large screen OLED display is generally easier to make. However, the threshold voltage of the a-Si TFT tends to shift as a DC voltage of both polarities continues to be applied to the a-Si TFT control terminal. This threshold voltage shift leads to a non-uniform current flowing in the OLED even if the same control voltage is applied to the TFT, resulting in degradation of picture quality in, and a shortened life span, of the OLED display.

To date, many pixel circuits have been proposed to compensate for a shift in threshold voltage, thereby preventing a degradation in picture quality. However, many of these pixel circuits require multiple TFTs, capacitors, and wiring, resulting in pixels having a low aperture ratio.

Accordingly, it is desirable to provide a display device that employs a simplified pixel circuit, minimizes the construction of the corresponding driving apparatus, and prevents a shift of the threshold voltage of an a-Si TFT, thereby preventing degradation of picture quality.

SUMMARY OF THE INVENTION

To achieve these and other advantages, embodiments of the present invention provide a display device including a light emitting element and a driving transistor for supplying driving current to the light emitting element, in which one of a data voltage or a reverse bias voltage is applied to the driving transistor in an alternating manner, and in which the reverse bias voltage is an AC voltage.

Embodiments of the display device can include a first switching transistor, connected to the driving transistor and configured to transmit the data voltage in response to a scanning signal, and a second switching transistor connected to the driving transistor and configured to transmit the AC reverse bias voltage in response to a switching signal.

The frequency of the reverse bias voltage may range between about 10 Hz to about 10,000 Hz. The duty ratio of the reverse bias voltage may range between about 10% to about 90%. The average of the maximum value and the minimum value of the reverse bias voltage may be less than about 0V. The minimum value of the reverse bias voltage may be less than about 0V. The maximum value of the reverse bias voltage may be equal to about 0V, or may be greater than about 0V.

The first switching transistor and the second switching transistor may be turned-on alternatingly, that is, in an alternating manner. The turn-on time of the first switching transistor may be longer than the turn-on time of the second switching transistor. The ratio of the turn-on time of the first switching transistor to the turn-on time of the second switching transistor may range between about 4:1 to about 16:1. The application time of the reverse bias voltage may be about ⅛ of the turn on time of the display device.

Exemplary embodiments of the display device may further include a capacitor for charging a voltage corresponding to the data signal. The data voltage may be applied to the driving transistor when the display device is in a turned-on state, and the reverse bias voltage may be applied to the driving transistor when the display device is in a turned-off state. The display device may further include a clock timer for measuring the turn on time of the display device.

In accordance with another aspect of the present invention, a display device is provided, which includes: a first pixel row group; a first pixel row group switching transistor; a first pixel row group driving transistor connected to the first pixel row group switching transistor; a second pixel row group; a second pixel row group switching transistor; and a second pixel row group driving transistor connected to the second pixel row group switching transistor. Each of the first and the second pixel row groups include at least one pixel row, formed of a plurality of pixels. Each pixel includes a light emitting element connected to the respective one of the first pixel row group driving transistor or the second pixel row group driving transistor; a first gate driver connected to the first pixel row group switching transistor and configured to transmit a first scanning signal; and a second gate driver connected to the second pixel row group switching transistor and configured to transmit a second scanning signal. In addition, a data voltage is applied to the first pixel row group driving transistor, and an AC reverse bias voltage is applied to the second pixel row group driving transistor.

The direction of applying the first scanning signal to the first pixel row group may be opposite to the direction of applying the second scanning signal to the second pixel row group. The AC reverse bias voltage may be applied after the data voltage is applied to the first pixel row group driving transistor, and the data voltage may be applied after the alternating current reverse bias voltage is applied to the second pixel row group driving transistor.

One frame is divided into a first interval having a first display interval and a first blanking interval, and a second interval having a second display interval and a second blanking interval. During the first display interval, the data voltage is applied to the first pixel row group driving transistor, and during the first blanking interval, the AC reverse bias voltage is applied to the second pixel row group driving transistor. During the second display interval, the data voltage is applied to the second pixel row group driving transistor, and during the second blanking interval, the AC reverse bias voltage is applied to the first pixel row group driving transistor.

In accordance with another aspect of the present invention, there is provided a method of driving a display device, the display device having a light emitting element and a driving transistor supplying current to the light emitting element, which method of driving the display device includes applying a data voltage to the driving transistor and applying a reverse bias voltage to the driving transistor, in which the reverse bias voltage is an AC voltage, i.e., an AC reverse bias voltage. When the display device is in a turned-on state, the data voltage may be turned on, and when the display device is in a turned-off state, the AC reverse bias voltage may be applied. In accordance with another aspect of the present invention, a method of driving a display device is provided for a display device including a first pixel row group, a first pixel row group switching transistor, a first pixel row group driving transistor connected to the first pixel row group switching transistor, a second pixel row group; a second pixel row group switching transistor; and a second pixel row group driving transistor connected to the second pixel row group switching transistor; in which each of the first and the second pixel row groups include at least one pixel row, formed of a plurality of pixels, and in which each pixel includes a light emitting element connected to the respective one of the first pixel row group driving transistor or the second pixel row group driving transistor, a first gate driver connected to the first pixel row group switching transistor and configured to transmit a first scanning signal, and a second gate driver connected to the second pixel row group switching transistor and configured to transmit a second scanning signal, the method of driving the display device including: applying a data voltage to the first pixel row group; applying an AC reverse bias voltage to the second pixel row group; applying the data voltage to the second pixel row group; and applying the AC reverse bias voltage to the first pixel row group.

DETAILED DESCRIPTION OF THE EMBODIMENTS

Figure 1:
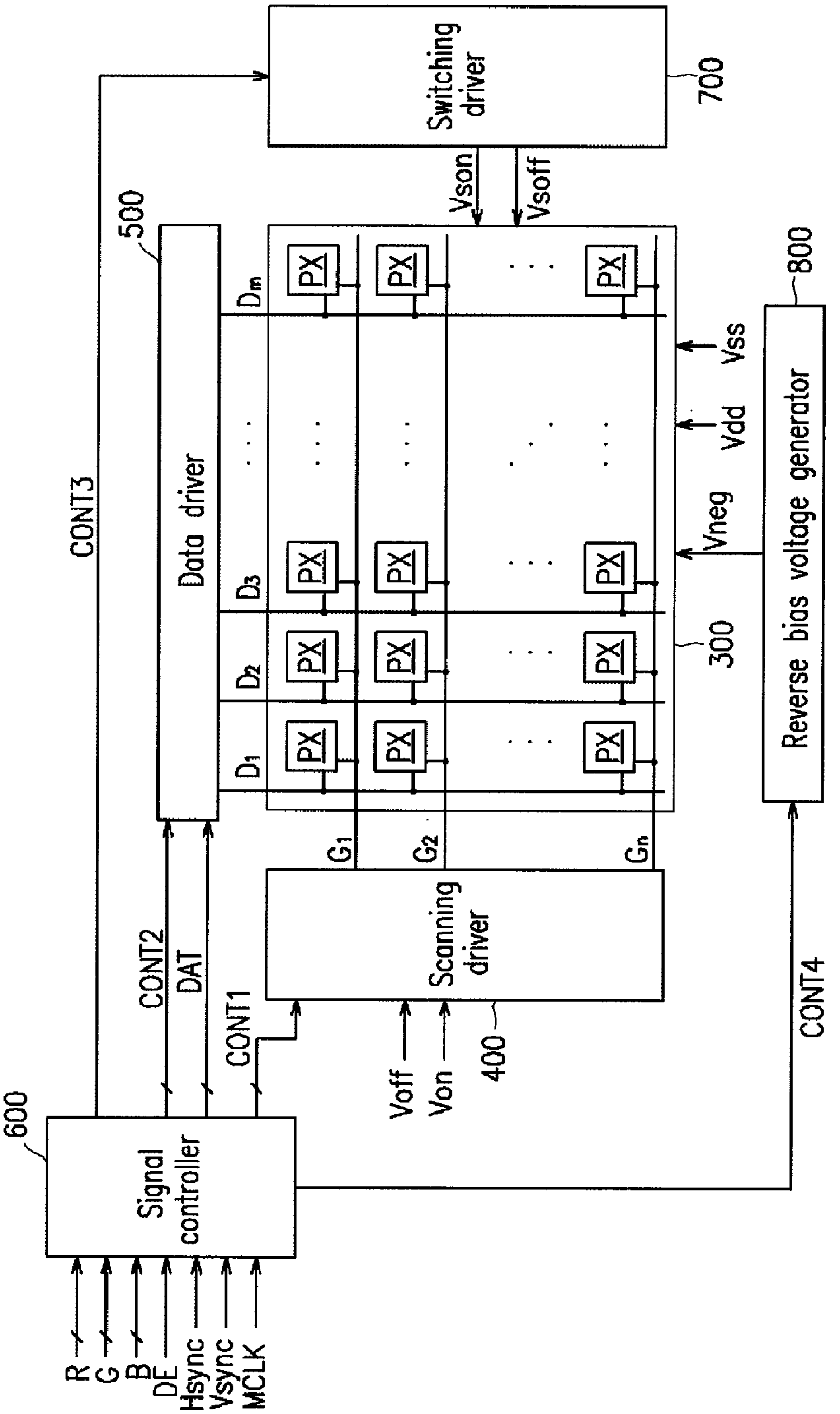
FIG. 1 is a block diagram of an OLED display in accordance with one exemplary embodiment of the present invention.

The present invention will be described more fully hereinafter with reference to the accompanying drawings, in which preferred embodiments of the invention are shown and described. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device and a driving method thereof in accordance with exemplary embodiments of the present invention will now be described in detail with reference to the accompanying drawings.

Figure 2:
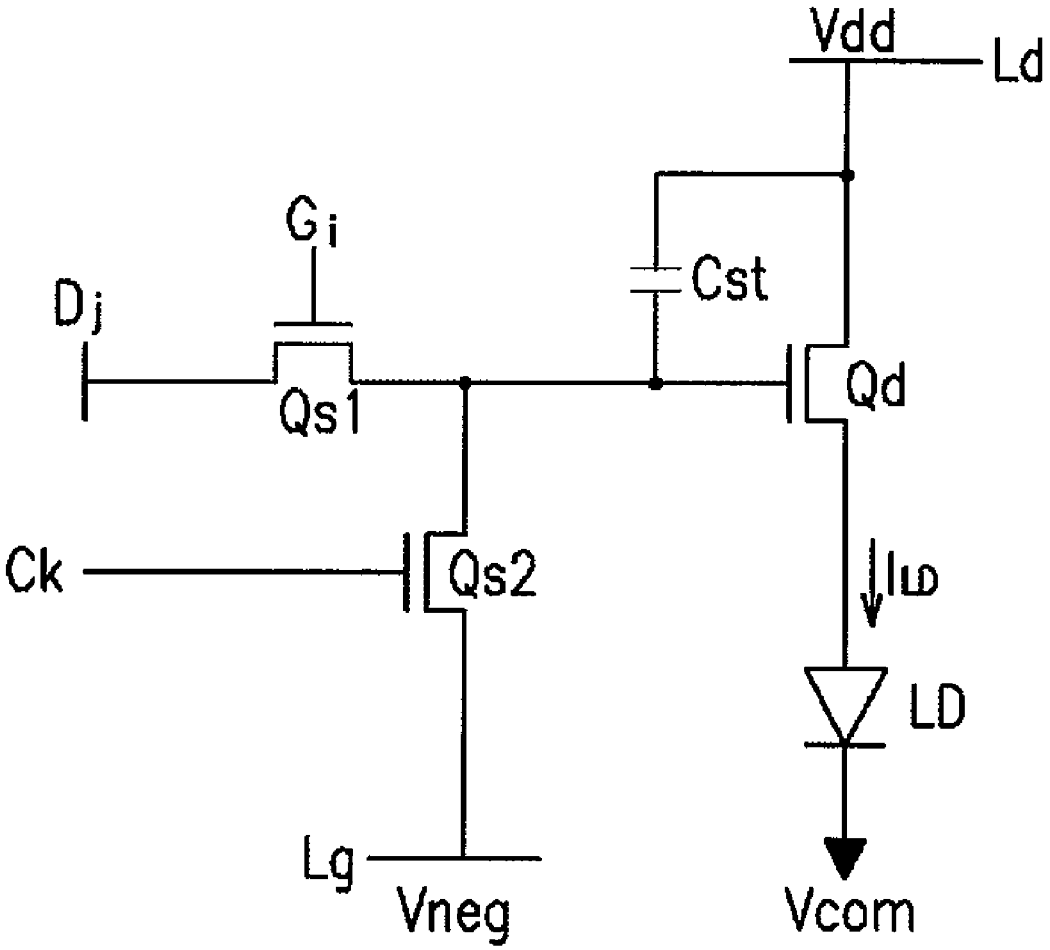
FIG. 2 is an equivalent circuit diagram of one pixel of an OLED display in accordance with FIG. 1.

FIG. 1 is a block diagram of an OLED display in accordance with one exemplary embodiment of the present invention, and FIG. 2 is an equivalent circuit diagram of one pixel of an OLED display in accordance with FIG. 1. As shown in FIG. 1, the OLED display includes a display panel 300; a scanning driver 400; a data driver 500 connected to the display panel 300; a switching driver 700; a reverse bias voltage generator 800; and a signal controller 600 for controlling the scanning driver 400, the data driver 500, the switching controller 700, and the reverse bias voltage generator 800.

In an equivalent circuit view, the display panel 300 includes a plurality of display signal lines $G_1$-$G_n$ and $D_1$-$D_m$; a plurality of driving voltage lines (not shown); and a plurality of pixels PX arranged substantially in a matrix structure, and connected to the display signal lines $G_1$-$G_n$ and $D_1$-$D_m$, and the driving voltage lines. The display signal lines $G_1$-$G_n$ and $D_1$-$D_m$ include a plurality of scanning signal lines $G_1$-$G_n$ that transmit scanning signals and a plurality of data lines $D_1$-$D_m$ that transmit data signals. The scanning signal lines $G_1$-$G_n$ extend substantially in a row direction and are separate from, and substantially parallel to, each other. The data lines $D_1$-$D_m$ extend substantially in a column direction and are separate from, and substantially parallel to, each other. The driving voltage lines transmit a driving voltage Vdd to each pixel.

As shown in FIG. 2, each pixel, for example, pixel PX, is connected to the scanning signal line $G_i$ and the data line data line $D_j$, and includes an OLED LD, a driving transistor Qd, a capacitor Cst, a first switching transistor Qs1, and a second switching transistor Qs2. The driving transistor Qd has three terminals: a control terminal connected to the switching transistors Qs and the capacitor Cst; an input terminal connected to the driving voltage line Ld applied with the driving voltage Vdd; and an output terminal connected to the OLED LD. The first switching transistor Qs1 also is a triple terminal element having a control terminal connected to the scanning signal line $G_i$; an input terminal connected to the data line $D_j$, respectively; and an output terminal connected to the capacitor Cst and the driving transistor Qd. The second switching transistor Qs2 also has three terminals: a control terminal connected to a switching control line Ck; an input terminal connected to a reverse bias voltage line Lg, to which is applied a reverse bias voltage Vneg; and an output terminal connected to the control terminal of the driving transistor Qd. The capacitor Cst is connected between the switching transistor Qs and the driving voltage Vdd, is charged with a data voltage from the first switching transistor Qs1, and maintains the data voltage for a predetermined time.

The anode of the OLED LD is connected to the driving transistor Qd, with the cathode being connected to a common voltage Vss. To display images, the OLED LD emits light at an intensity that corresponds to the magnitude of a current $I_{LD}$ supplied by the driving transistor Qd The magnitude of the current $I_{LD}$ corresponds to the magnitude of a voltage Vgs between the control terminal and output terminal of the driving transistor Qd.

Typically, each of the switching transistor Qs and the driving transistors Qd is an n-channel field effect transistor (FET), which may be made of, for example, a-Si or polysilicon. Alternatively, transistors Qs and Qs may be complementary p-channel FETs, in which case, the operation, voltage, and current of the p-channel FET is opposite to those of the n-channel FET.

Figure 3:
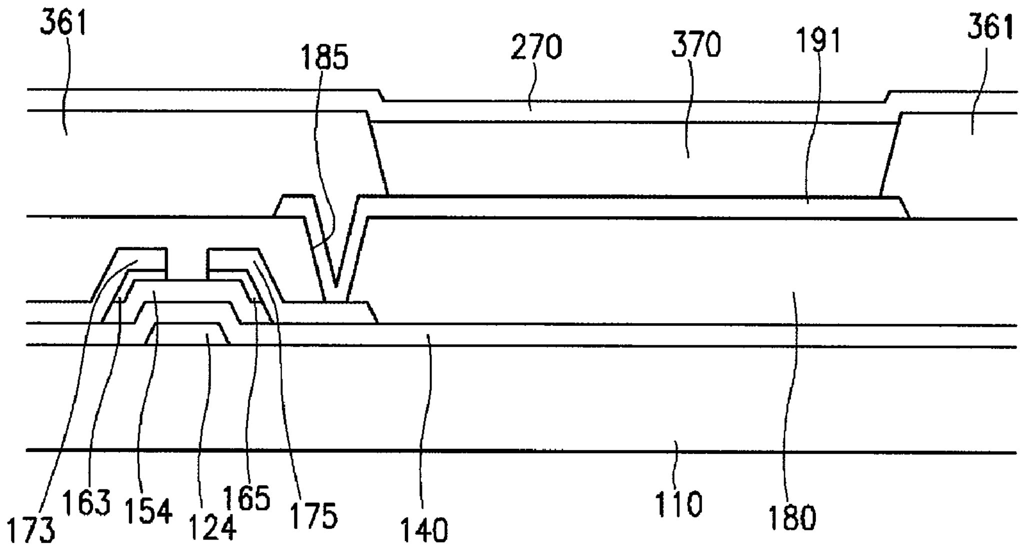
FIG. 3 is a cross-sectional view showing one example of a cross section of a driving transistor and of an OLED of the one pixel of the OLED display as shown in FIG. 2.
Figure 4:
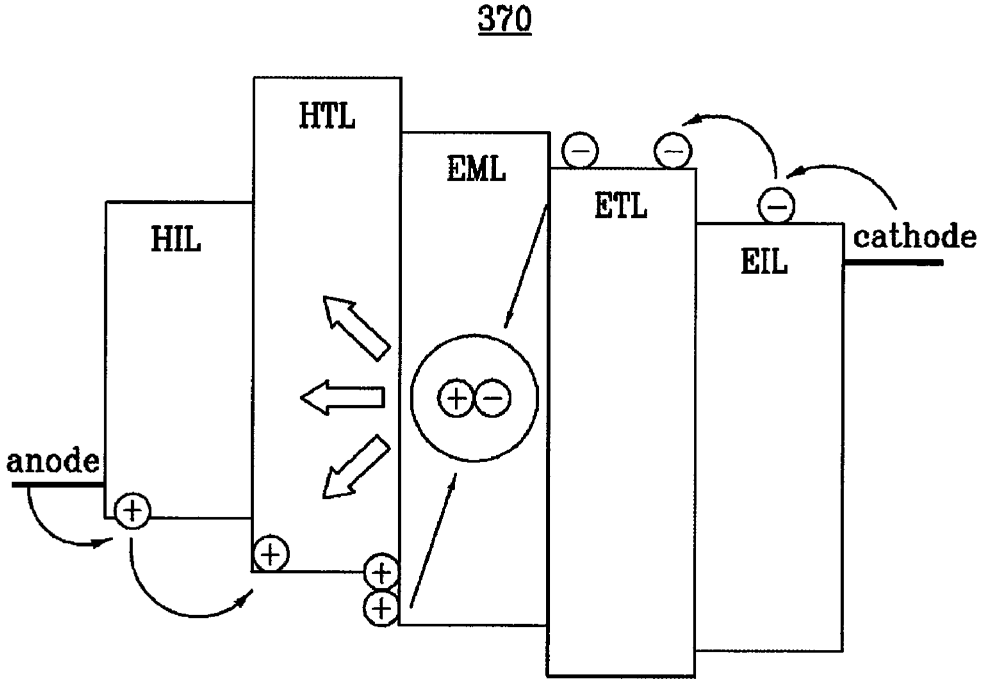
FIG. 4 is a schematic view of an OLED of an OLED display in accordance with an exemplary embodiment of the present invention.

The structure of the driving transistor Qd and the OLED LD of the OLED display as shown in FIG. 2 will now be described in detail with reference to FIGS. 3 and 4. FIG. 3 is a cross-sectional view showing one example of a cross section of a driving transistor and of an OLED of the one pixel of the OLED display as shown in FIG. 2, and FIG. 4 is a schematic view of an OLED of an OLED display in accordance with one exemplary embodiment of the present invention. A control terminal electrode 124 is formed on an insulating substrate 110 of a conductive material, including without limitation, aluminum (Al)-based metals, such as Al and Al alloys; silver (Ag)-based metals such as Ag and Ag alloys; copper (Cu)-based metals such as Cu and Cu alloys; molybdenum (Mo)-based metals such as Mo and Mo alloys; and metals such as chromium (Cr), titanium (Ti), and tantalum (Ta).

The control terminal electrode 124 may be formed as a single conductive layer. However, the control terminal electrode 124 also may be formed as a multi-layered structure, that includes at least two conductive layers (not shown), each having different physical properties. For example, to reduce signal delay or voltage drop, one conductive layers may be made of a low resistivity metal having, including without limitation, an Al-based metal, a Ag-based metal, or a Cu-based metal. In a two-layered structure, the other conductive layer may be made of a material that exhibits excellent physical, chemical, and electrical characteristics for making contact with other materials, including ITO (indium tin oxide) or IZO (indium zinc oxide), with exemplary conductive layer materials including, for example, a Mo-based metal, or a metal such as Cr, Ti, or Ta. Suitable exemplary multi-layered structures can include a structure having a Cr lower layer and an upper layer of Al or Al alloy; and a structure having a lower layer of Al or Al alloy, and an upper layer of Mo or Mo alloy. Advantageously, the control terminal electrode 124 is inclined relative to a surface of the substrate 110, with the inclination angle being in a range of between about 30° to about 80°.

An insulating layer 140 made of silicon nitride (SiNx) is formed on the control terminal electrode 124. A semiconductor 154 made of hydrogenated a-Si or polysilicon is formed on the insulating layer 140. A pair of ohmic contacts 163 and 165 is formed on the semiconductor 154, and may be made of silicide, or n+ hydrogenated a-Si heavily doped with an n-type impurity. The lateral sides of the semiconductor 154 and the ohmic contacts 163 and 165 are inclined with respect to the surface of the substrate, with the respective inclination angles being in a range of between about 30° to about 80°.

An input terminal electrode 173 is formed on the ohmic contact 163 and the insulating layer 140. Similarly, an output terminal electrode 175 is formed on the ohmic contact 165 and the insulating layer 140. The input terminal electrode 173 and the output terminal electrode 175 are made of Cr-based and Mo-based metals, or refractory metals such as Ta and Ti; and may have a multilayered-structure including a refractory metal lower layer (not shown) upon which is disposed an upper layer of a low resistivity material. An exemplary two-layered structure includes a lower layer formed of Cr, a Cr alloy, Mo, or a Mo alloy; with an upper layer formed of Mo, Mo alloy, Al, or Al alloy. An exemplary three-layered structure includes upper and lower layers, each formed of Mo or Mo alloy, with an intermediate layer formed of Al or Al alloy. Like the control terminal electrode 124, the lateral sides of the input terminal electrode 173 and the output terminal electrode 175 are inclined, with the respective inclination angles being in a range of between about 30° to about 80°.

The input terminal electrode 173 and the output terminal electrode 175 are disposed to be separate from each other, on either side of the control terminal electrode 124. A channel is formed on the semiconductor 154 between the input terminal electrode 173 and the output terminal electrode 175. The control terminal electrode 124, the input terminal electrode 173, and the output terminal electrode 175, along with the channel on semiconductor 154, define the driving transistor Qd. To reduce the contact resistance therebetween, the ohmic contact 163 is interposed between the underlying semiconductor 154 and the overlying input terminal electrode 173, with the ohmic contact 165 likewise being interposed between the semiconductor 154 and the output terminal electrode 175. An exposed portion of semiconductor 154 is not covered by the input terminal electrode 173 or by the output terminal electrode 175.

A passivation layer 180 is formed on the input terminal electrode 173, the output terminal electrode 175, the exposed portion of the semiconductor 154, and the insulating layer 140. The passivation layer 180 may be made of an inorganic insulating material, such as silicon nitride (SiNx) or silicon oxide (SiOx), of an organic insulating material, or of a low dielectric insulating material. Desirably, the dielectric constant of the low dielectric organic material is below about 4.0, with exemplary materials including without limitation, a-Si:C:O or a-Si:O:F, formed by plasma enhanced chemical vapor deposition (PECVD). The passivation layer 180 may be a photosensitive organic insulating material. The surface of the passivation layer 180 may be flat. In addition, the passivation layer 180 may be formed as a dual-layered structure that includes an inorganic lower layer and an organic upper layer, with the latter layer protecting the exposed portion of the semiconductor 154. The passivation layer 180 has a contact hole 185 exposing the output terminal electrode 175.

A pixel electrode 191 is formed on the passivation layer 180. The pixel electrode 191 is physically and electrically connected to the output terminal electrode 175 through the contact hole 185. The pixel electrode 191 may be made of a transparent conductive material such as IZO or ITO, or of a reflective metal such as an Al alloy or a Ag alloy. A partition 361 is formed on the passivation layer 180 to surround the pixel electrodes 191 like a bank to define openings. The partition 361 may be made of an organic insulating material, or of an inorganic insulating material.

As shown in FIG. 4, an organic light emitting member 370 is formed on the pixel electrodes 191 and disposed in the openings defined by the partition 361. The organic light emitting member 370, can have a multi-layered structure that includes a light emission layer EML and, optionally, supplementary layers, which improve the luminous efficiency of the light emission layer EML. The supplementary layers include an electron transport layer ETL and a hole transport layer HTL, which maintain a balance between electrons and holes, and an electron injecting layer EIL and a hole injecting layer HIL, which enhancing the injection of electrons and holes.

A common electrode 270 is formed on the partition 361 and the organic light emitting member 370, using a reflective metal or a transparent conductive material. Exemplary reflective metals include without limitation, Calcium (Ca), Barium (Ba), Al, or Ag; and exemplary transparent conductive materials include such as ITO or IZO. Desirably, the common electrode is supplied with a common voltage Vss.

A transparent common electrode 270 and an opaque pixel electrode 191 are suitable for use with a top emission type of OLED display, which displays an image upward of the display panel 300. By contrast, a transparent pixel electrode 191 and an opaque common electrode 270 are suitable for use with a bottom emission type of OLED display, which displays an image downward of the display panel 300.

As shown in FIG. 2, the pixel electrode 191, the organic light emitting member 370, and the common electrode 270 form the organic light emitting diode LD, with the pixel electrode 191 serving as an anode and the common electrode 270 serving as a cathode. Alternatively, the pixel electrode 191 can serve as a cathode and the common electrode 270 can serve as an anode. The primary color produced by the OLED LD corresponds to the material used to form the organic light emitting member 370. The primary colors include red, green, and blue, with another desired color being displayed by the spatial summation of the three primary colors.

Referring to FIG. 1, the scanning driver 400 is connected to the scanning signal lines $G_1$-$G_n$, and applies a signal line comprised of a combination of a high voltage Von for turning on the first switching transistor Qs1, and a low voltage Voff for turning off the same to the scanning signal lines $G_i$-$G_n$. The data driver 500 is connected to, and applies a data voltage to, the data lines $D_1$-$D_m$. The switching driver 700 is connected to, and applies a switching signal to, a switch control line Ck. The switching signal can be a high voltage Vson for turning on the second switching transistor Qs2, as well as a low voltage Vsoff for turning off the same to the switch control line Ck. The reverse bias voltage generator 700 is connected to a reverse bias voltage line Lg, and applies a reverse bias voltage Vneg to each pixel.

The signal controller 600 controls operations of the scanning driver 400, the data driver 500, the switching controller 700, and the reverse bias voltage generator 800. The signal controller 600 is supplied with input image signals R, G, and B, and with input control signals controlling the display of the input image, including a vertical synchronization signal Vsync, a horizontal synchronization signal Hsync, a main clock MCLK, and a data enable signal DE from an external graphics controller (not shown). On the basis of the input image signals R, G, and B, and of the input control signals, the signal controller 600 processes the image signals R, G, and B, to render them suitable for the operation of the display panel 300, and generates scanning control signals CONT1, data control signals CONT2, switching control signals CONT3, and reverse bias control signals CONT4.

The signal controller 600 transmits the scanning control signals CONT1 to the scanning driver 400, the data control signals CONT2 and the processed image signals DAT to the data driver 500, the switching control signals CONT3 to the switching controller 700, and the reverse bias control signals CONT4 to the reverse bias voltage generator 800.

The scanning control signals CONT1 include a vertical synchronization start signal STV that initiates the scanning of the high voltage Von, and at least one clock signal that controls the output of the high voltage Von. Additionally, the scanning control signals CONT1 may include an output enable signal for defining the duration of the high voltage Von. The data control signals CONT2 include a horizontal synchronization start signal STH, indicating a start of data transmission for a row of pixels; a load signal LOAD, causing the corresponding data voltage to be applied to the data lines $D_1$-$D_m$; and a data clock signal HCLK. The switching control signals CONT3 include a vertical synchronization start signal STV, causing the scanning of the high voltage Vson to start; and at least one clock signal controlling the output of the high voltage Vson. In addition, the switching control signals CONT3 may include an output enable signal, which defines the duration of the high voltage Vson.

Each of the drivers 400, 500, 600, 700, and 800 may be as at least one integrated circuit (IC) chip mounted directly on the LC panel assembly 300, or on a flexible printed circuit film (not shown); and may be attached to the LC panel assembly 300 in the form of a tape carrier package (TCP), or may be attached to the LC panel assembly 300 mounted on a separate printed circuit board (not shown). Alternately, the drivers 400, 500, 600, 700, and 800 may be integrated directly onto the LC panel assembly 300. Furthermore, one or more of the drivers 400, 500, 600, 700, and 800 may be integrated into a single chip, with those of drivers 40, 500, 600, 700, and 800, not being integrated into a single chip being located outside of the single chip.

Figure 5:
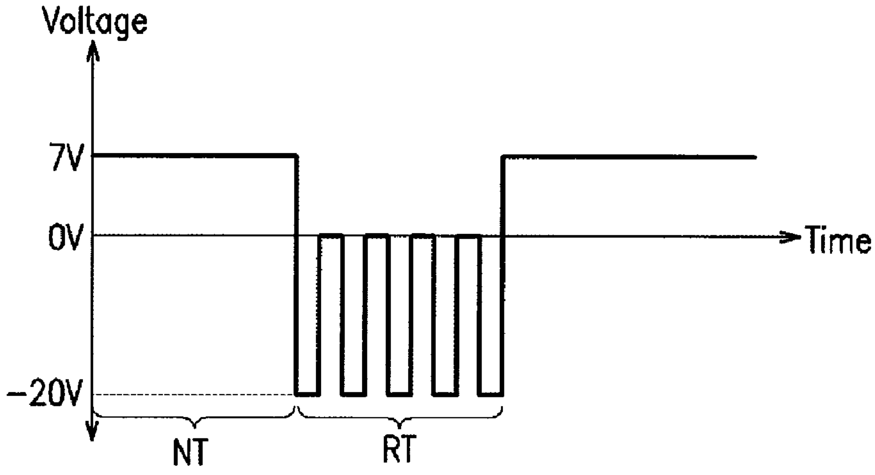
FIG. 5 is a waveform diagram illustrating a voltage applied to a driving transistor of an OLED display in accordance with one exemplary embodiment of the present invention.

FIGS. 5 through 8 provide a detailed description of the operation of an exemplary OLED display. FIG. 5 is a signal waveform diagram of an exemplary OLED display, which illustrates that the signal controller 600 divides one frame into two intervals, NT and RT, for displaying images. In the first interval NT, the data driver 500 receives image data DAT for a row of pixels sequentially in response to the data control signals CONT2 from the signal controller 600, converts each image data DAT to the corresponding normal voltage Vdat, and then applies each image data DAT to the corresponding data lines $D_1$-$D_m$.

The scanning driver 400 applies a scanning signal to the scanning signal lines $G_1$-$G_n$ in response to the scanning control signals CONT1 from the signal controller 600, in order to turn on the first switching transistor Qs1, which is connected to the scanning signal lines $G_1$-$G_n$. Accordingly, the normal voltage Vdat applied to the data lines $D_1$-$D_m$ is applied to the control terminal of the corresponding driving transistor Qd through the corresponding turned-on first switching transistor Qs1.

The data voltage Vdat applied to the driving transistor Qd is charged in the capacitor Cst, with the charged voltage being maintained while the first switching transistor Qs1 is turned off. When the data voltage Vdat is applied, the driving transistor Qd is turned on, to output a current $I_{LD}$ corresponding to the voltage Vdat. As the current $I_{LD}$ flows through the OLED LD, images are displayed on the corresponding pixels PX.

A horizontal period 1H is constituted of the time required for the data driver 500 and the scanning driver 400 to operate on one horizontal row of pixels. After 1 horizontal period 1H, the data driver 500 and the scanning driver 400 repeat the same operation for the next row of pixels PX. In this manner, the scanning signals are sequentially applied to all of the scanning signal lines $G_1$-$G_n$ in the first interval NT, to thus apply the data voltage Vdat to all of the pixels PX. The second interval RT is started after the data voltage Vdat is applied to all of the pixels PX. Responsive to the reverse bias voltage control signals CONT4 from the signal controller 600, the reverse bias voltage generator 800 applies the reverse bias voltage Vneg to the corresponding reverse bias voltage line Ln. The switching driver 700 applies a switching signal to the switching signal line Ck to turn on the second switching transistor Qs2 responsive to the switching control signals CONT3 from the signal controller 600. Therefore, the reverse bias voltage Vneg applied to the reverse bias voltage line Lg is applied to the control terminal of the corresponding driving transistor Qd through the corresponding turned-on switching transistor.

Figure 6:
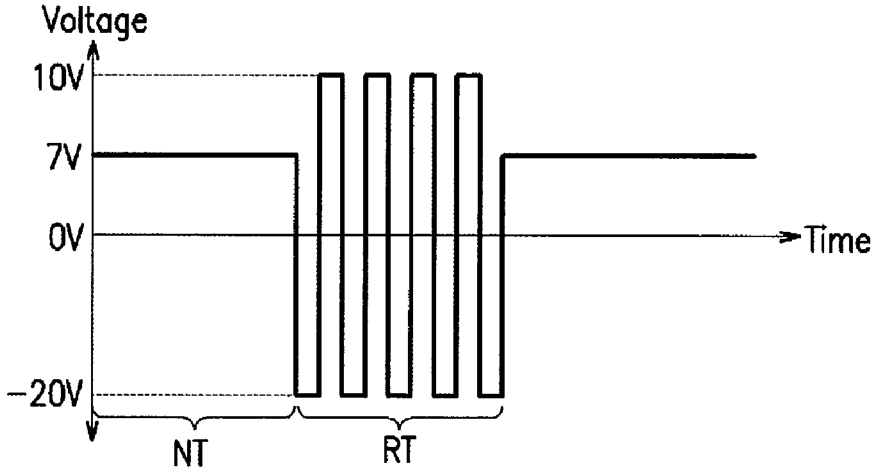
FIG. 6 is a waveform diagram illustrating a voltage applied to a driving transistor of an OLED display in accordance with another exemplary embodiment of the present invention.

The reverse bias voltage Vneg is an AC voltage to which maximum and minimum values are periodically applied. For example, as shown in FIG. 5, an AC voltage having a maximum value of 0V and a minimum value of −20V is applied as the reverse bias voltage Vneg. Alternatively, as shown in FIG. 6, the reverse bias voltage Vneg may be an AC voltage having a maximum value of 10V and a minimum value of −20V. A reverse bias voltage in the form of an AC voltage is termed an AC reverse bias voltage. The amplitude of the reverse bias voltage Vneg may be selected in accordance with factors including without limitation the range of a data voltage Vdat, and the OLED LD types or characteristics. Desirably, the average of the maximum value and minimum value of the voltage is less than about 0V. The frequency of such an AC reverse bias voltage ranges between about 10 Hz to about 10,000 Hz, and the duty ratio thereof ranges between about 10% to about 90%. In a typical frame, the ratio of the time of the first interval NT, to the time of the second interval RT, ranges between about 4:1 to about 16:1.

The AC reverse bias voltage Vneg applied to the driving transistor Qd is charged in the capacitor Cst, with the charged voltage being maintained when second switching transistor Qs2 is turned off. The driving transistor Qd is turned off when the reverse bias voltage Vneg is applied. Thus, black is displayed on the screen of the OLED display when no current flows through the corresponding OLED LD, and the OLED LD does not emit light.

The data driver 500, the scanning driver 400, the switching driver 700, and the reverse bias voltage generator 800 repeat the same operation for the next row of pixels PX, after 1 horizontal period (1H). In this manner, the switching control signals are sequentially applied to all of the switching control lines Ck in the latter half of the frame, and the reverse bias voltage Vneg is applied to all of the pixels PX. The second interval RT is terminated when the reverse bias voltage Vneg is applied to all of the pixels PX, with the next frame commencing by repeating the same operations.

Typically, when a positive DC voltage is applied for a long period to the driving transistor Qd control terminal, the threshold voltage of the driving transistor Qd shifts, thereby degrading picture quality. By applying the reverse bias voltage Vneg to the control terminal of the driving transistor Qd, the stress caused by a typical positive data voltage Vdat is eliminated, and a shift in the threshold voltage of the driving transistor Qd may be prevented.

Although the above description has been made with respect to an embodiment in which an AC reverse bias voltage is applied to a separate second switching transistor Qs2 connected to the reverse bias line, the present invention is not limited thereto, and an AC reverse bias voltage may be applied to the driving transistor Qd using various methods. For example, the data driver may generate both a normal data voltage and an reverse bias voltage, with one of the two voltages being selectively applied. Also, the reverse bias voltage may be applied by generating an AC voltage using a separate apparatus.

Figure 7:
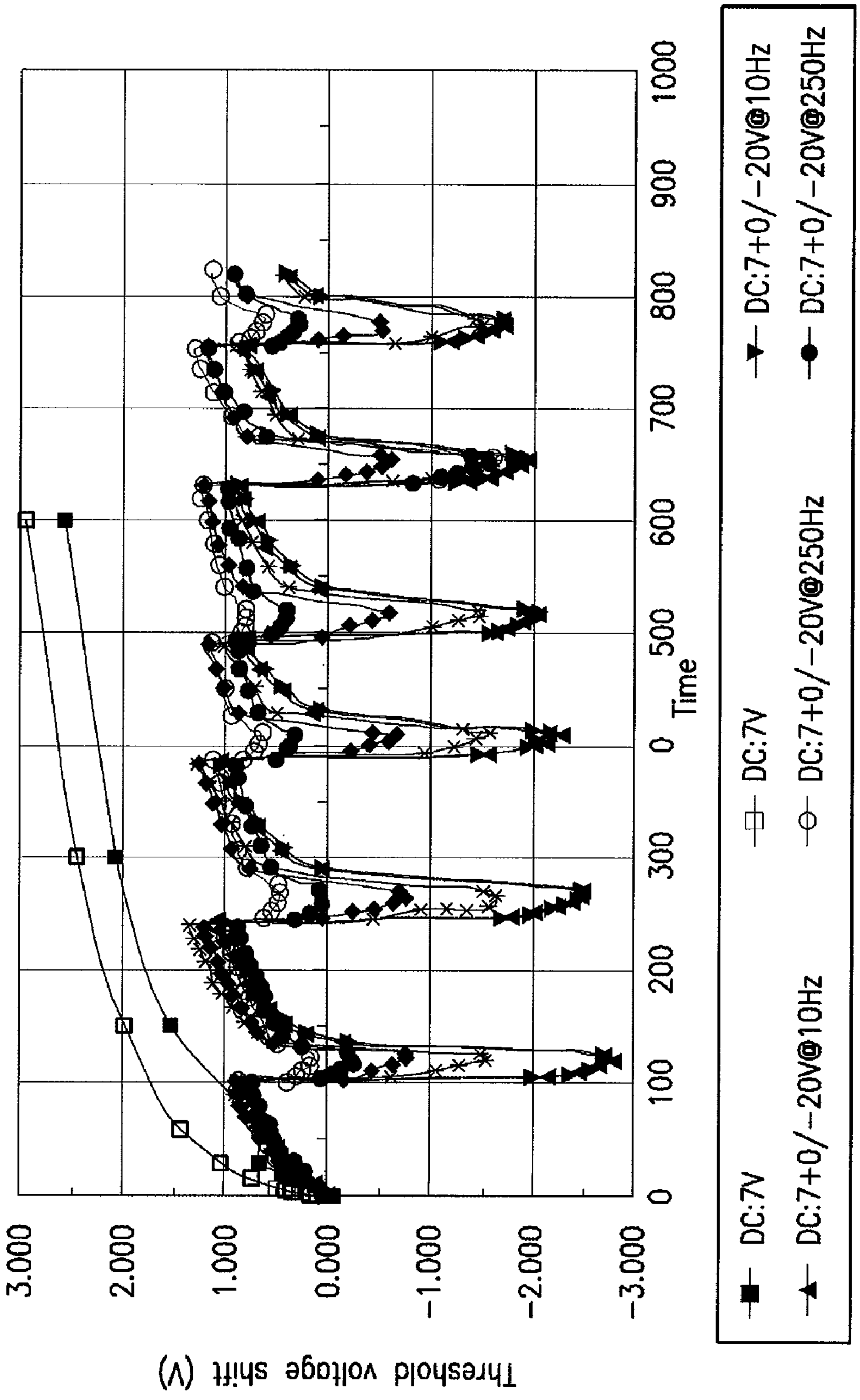
FIG. 7 is a graph illustrating a change in the threshold voltage of an OLED display with the passage of time in accordance with the teachings of the present invention.
Figure 8:
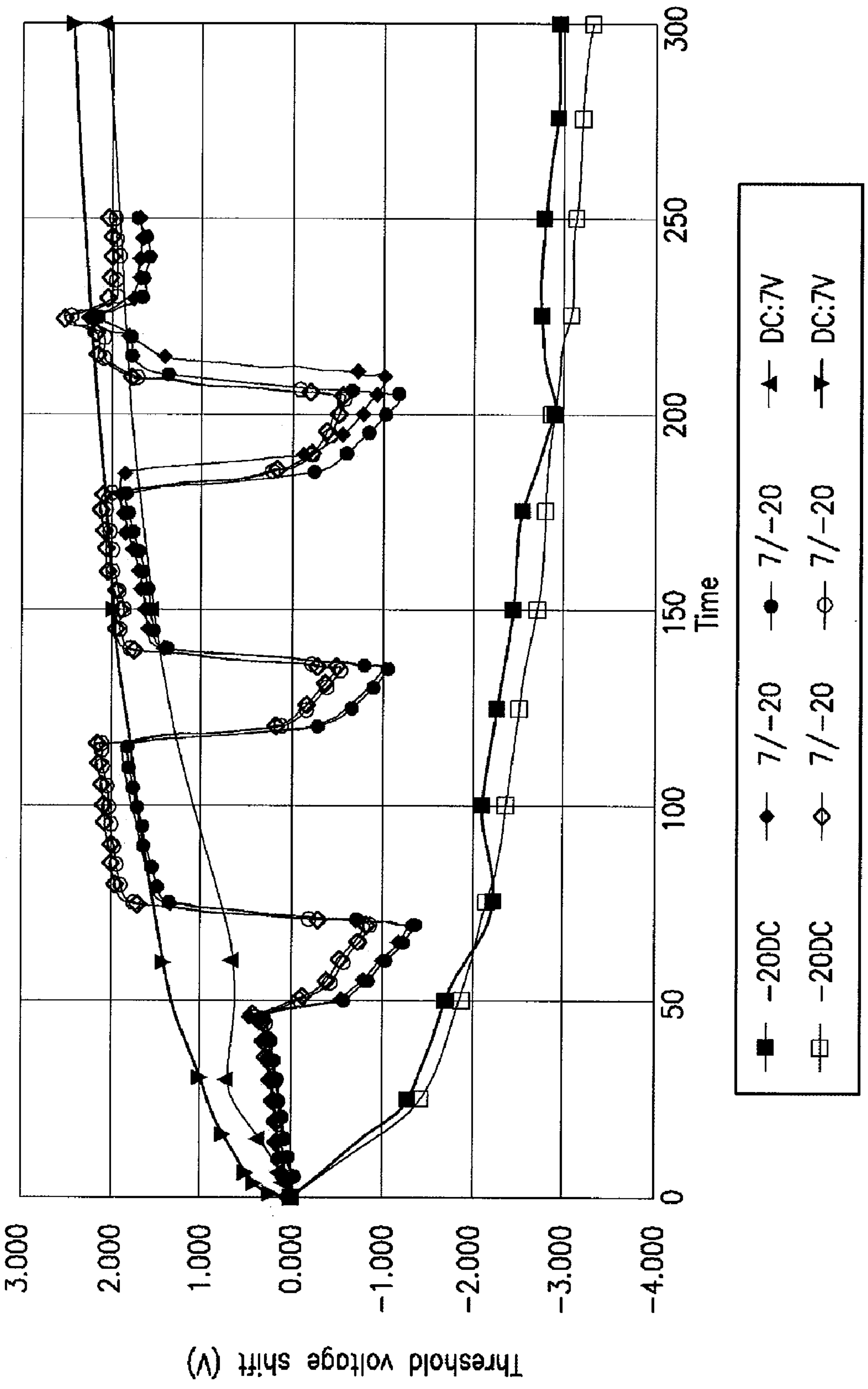
FIG. 8 is a graph illustrating a change in the threshold voltage of an OLED display with the passage of time along with a comparison group in accordance with the prior art.

Now, the effects of the OLED display in accordance with the present invention will be described with reference to FIGS. 7 and 8. FIGS. 7 and 8 are exemplary graphs showing a shift in the threshold voltage of an OLED display over time, in accordance with embodiments of the present invention. FIG. 7 illustrates experimentally-obtained shifts in threshold voltage of the driving transistor Qd occurring over time, as corresponding to the voltage applied to the control terminal of driving transistor Qd, with and without application of an AC reverse bias voltage Vneg. Each of the experiments is performed two times.

FIG. 7 illustrates that a shift in the threshold voltage of the driving transistor Qd occurs when a DC voltage of positive (+) polarity (7VDC) is applied to the control terminal of the driving transistor Qd, but without application of a reverse bias voltage Vneg. In particular, it is empirically observed that if a data voltage Vdat is continuously applied to the control terminal of the driving transistor Qd, but a reverse bias voltage Vneg is not applied, the threshold voltage gradually increases, approximating about 3V after the passage of about 600 hours. However, when an AC reverse bias voltage Vneg is applied in the form of a preselected AC voltage at a preselected frequency, a shift in the threshold voltage of the driving transistor Qd can be minimized or prevented.

To obtain other empirical results indicated in FIG. 7, a DC voltage is continuously applied to the control terminal of the driving transistor Qd for about 100 hours, and then an preselected AC reverse bias voltage Vneg is applied for about one day (about 24 hours). As before, a DC voltage of positive (+) polarity (about 7VDC) is applied to the control terminal of the driving transistor Qd, followed by the application of a preselected reverse bias voltage. One preselected reverse bias voltage Vneg employs a first preselected AC voltage varying between about 0V to about −20V at a first frequency of about 10 Hz (DC: 7V; AC: +0V/−20V@10 Hz). Another preselected reverse bias voltage Vneg employs a second preselected AC voltage varying between about 0V and about −20V at a second preselected frequency of about 250 Hz (DC: 7V; AC: +0V/−20V@250 Hz).

In particular, it is empirically observed if an AC reverse bias voltage Vneg, having a predetermined frequency and a preselected AC voltage value, is applied to the control terminal of the driving transistor Qd, the threshold voltage increases by approximately about 1V, then drops to a certain level, and then is restored, with the same procedure being repeated with a period of approximately 100 hours. As a result, there is minimal shift in threshold voltage even after the lapse of about 800 hours. In FIG. 7, the preselected frequency is selected to be about 10 Hz or about 250 Hz, and the preselected AC voltage magnitude for the reverse bias voltage Vneg is selected to periodically vary between about 0V to about −20V.

FIG. 8 illustrates experimentally-obtained shifts in threshold voltage of the driving transistor Qd occurring over time, as corresponding to the voltage applied to the control terminal of driving transistor Qd, with and without application of a DC reverse bias voltage Vneg, as is typical of the prior art. Each of the experiments is performed two times. FIG. 8 illustrates that a shift in the threshold voltage of the driving transistor Qd occurs when a DC voltage of positive (+) polarity (7 VDC) is applied to the control terminal of the driving transistor Qd, but without application of a reverse bias voltage Vneg. If a data voltage Vdat of positive (+) polarity is continuously applied to the control terminal of the driving transistor Qd but the reverse bias voltage Vneg is not applied, the threshold voltage gradually increases to surpass about 2V after the passage of about 300 hours. In addition, FIG. 8 illustrates that a shift in the threshold voltage of the driving transistor Qd occurs when a DC voltage of negative (−) polarity (−20 VDC) is applied to the control terminal of the driving transistor Qd, but without application of a reverse bias voltage Vneg. If the reverse bias voltage Vneg is not applied but a data voltage Vdat of negative (−) polarity is continuously applied to the control terminal of the driving transistor Qd, the threshold voltage decreases to a negative value surpassing (in magnitude) about −3V after the passage of about 300 hours.

In addition, FIG. 8 illustrates that if a constant DC voltage of about −20V is applied as the reverse bias voltage Vneg to the control terminal of the driving transistor Qd for a predetermined period of time, the threshold voltage of the driving transistor Qd slightly increases for up to about 50 hours, and then the threshold voltage decreases to thus recover the threshold voltage shift after the passage of about 50 hours. However, after the initial recovery, the threshold voltage increases by an amount much greater than that obtained during the initial 50 hours, but the recovery amount does not reach the amount by which the threshold voltage shift increases. Accordingly, as the shift and recovery of the threshold voltage repeat over time, the recovery amount still does not reach the amount by which the threshold voltage shift increases. As a result, after the passage of about 250 hours, a considerable threshold voltage shift develops, thereby degrading the picture quality of an existing OLED display. Thus, as is in the present embodiments, a threshold voltage shift can be reduced greatly by applying an AC reverse bias voltage Vneg to the control electrode of the driving transistor Qd, for example, in comparison to the foregoing results where reverse bias voltage Vneg is applied as a DC voltage.

Figure 9:
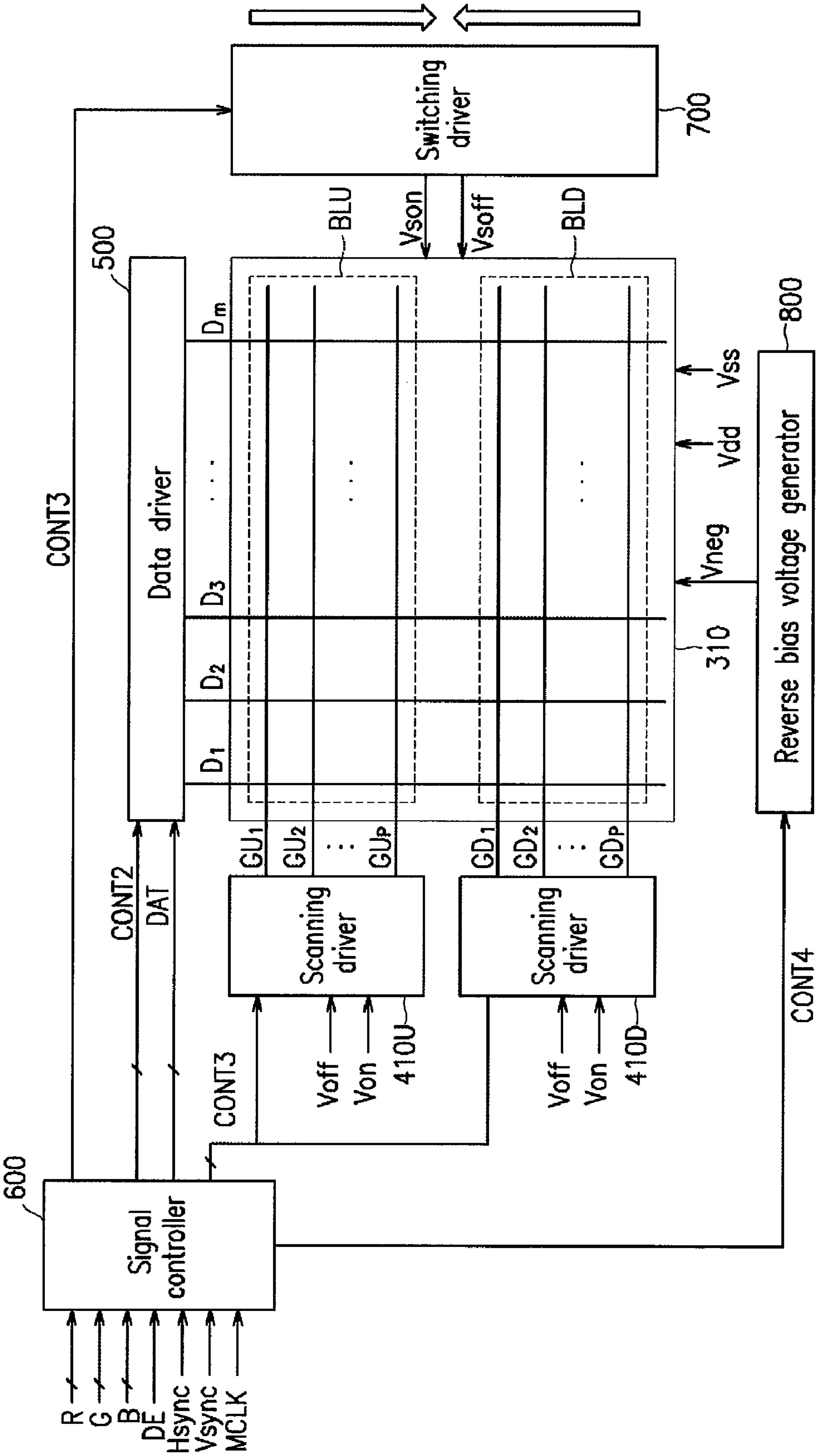
FIG. 9 is a block diagram illustrating an OLED display in accordance with another exemplary embodiment of the present invention.

Now, an OLED display in accordance with another exemplary embodiment of the present invention will be described in detail with reference to FIG. 9. FIG. 9 is a block diagram showing an OLED display in accordance with another exemplary embodiment of the present invention. As shown in FIG. 9, the exemplary OLED display includes a display panel 310, scanning drivers 410U and 410D connected thereto, a data driver 500, a switching driver 700, a reverse bias voltage generator 800, and a signal controller 600 controlling the scanning drivers 410U and 410D, the data driver 500, the switching driver 700, and the reverse bias voltage generator 800.

The display panel 310 is divided into two upper and lower blocks BLU and BLD. In an equivalent circuit view, display panel 310 includes a plurality of scanning signal lines $GU_1$-$GU_p$ and $GD_1$-$GD_p$; a plurality of data lines $D_1$-$D_m$; a plurality of driving voltage lines (not shown); and a plurality of pixels PX arranged substantially in a matrix structure and connected to the scanning signal lines $GU_1$-$GU_p$ and $GD_1$-$GD_p$, the data lines $D_1$-$D_m$, and the driving voltage lines.

The scanning signal lines $GU_1$-$GU_p$ transmit scanning signals $VU_1$-$VU_p$, and are disposed on the upper block BLU. The scanning signal lines $GD_1$-$GD_p$ transmit scanning signals $VD_1$-$VD_p$ and are disposed on the lower block BLD. The scanning signal lines $GU_1$-$GU_p$ and $GD_1$-$GD_p$ extend substantially in a row direction and are separate from, and substantially parallel to, each other. The data lines $D_1$-$D_m$ transmit data voltages Vout, and extend substantially in a column direction through the upper and lower blocks BLU and BLD, and are separate from, and substantially parallel to, each other. Other structures of the display panel 310 are similar to those as shown in FIG. 1, and particularly, a pixel structure of the display panel 310 is substantially the same as that as shown in FIG. 2.

The scanning drivers 410U and 410D are connected to the scanning signal lines $GU_1$-$GU_p$ and $GD_1$-$GD_p$, respectively. In response to scanning control signals CONT3 from the signal controller 600, the scanning drivers 410U and 410D apply scanning signals $VU_1$-$VU_p$ and $VD_1$-$VD_p$ to the scanning signal lines $GU_1$-$GU_p$ and $GD_1$-$GD_p$. Scanning signals $VU_1$-$VU_p$ and $VD_1$-$VD_p$ can be comprised of a combination of a high voltage Von and a low voltage Voff. The data driver 500 and the signal controller 600 are substantially the same as those as shown in FIGS. 1 and 5, and the characteristics pertaining to the OLED display embodiments illustrated in FIGS. 1 through 7*b* also are applicable to the OLED display of FIG. 10.

Figure 10:
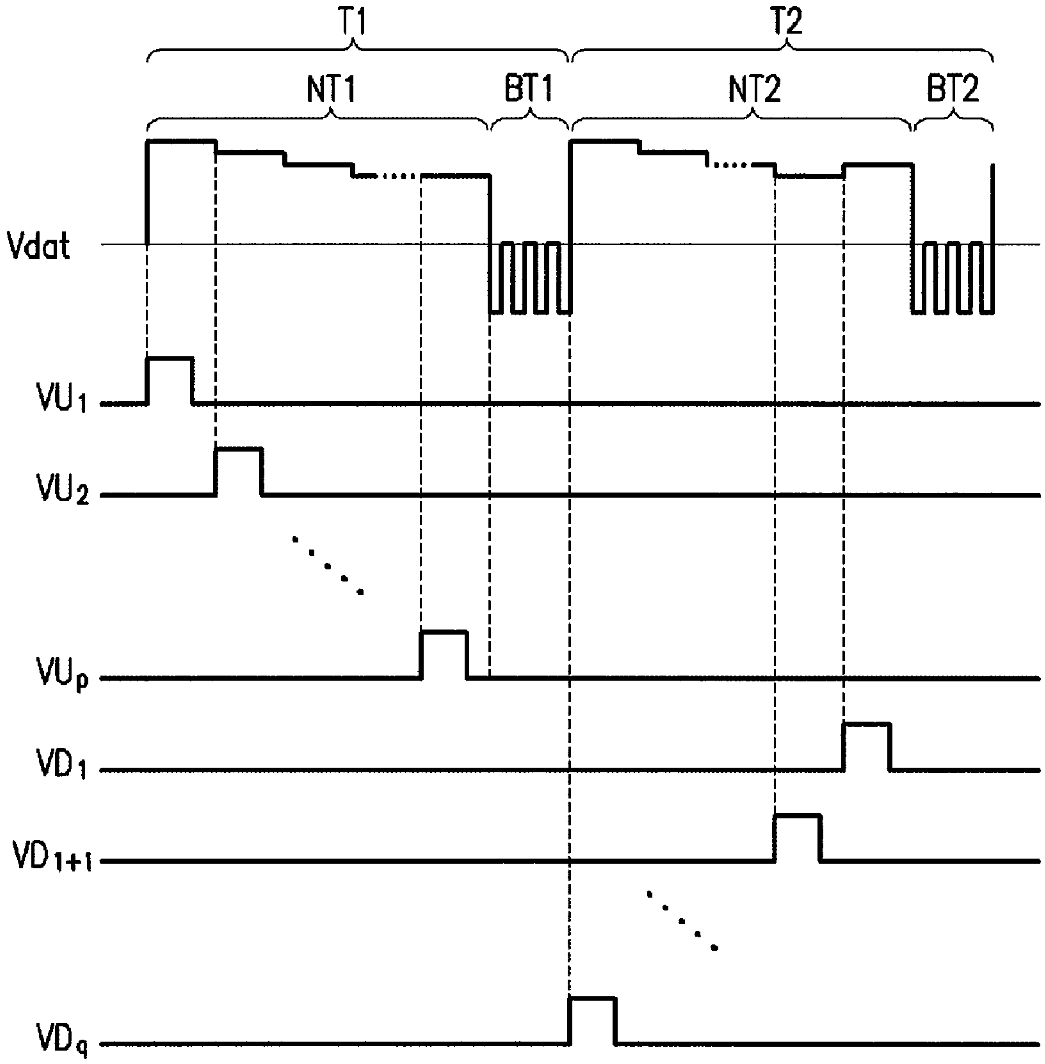
FIG. 10 is a waveform diagram illustrating a driving signal of an OLED display in accordance with another exemplary embodiment of the present invention.

Now, the operation of the OLED display will be described in detail with reference to FIG. 10. FIG. 10 illustrates a waveform diagram of a driving signal applied to an exemplary OLED display in accordance with another embodiment of the present invention. Referring to FIG. 10, the signal controller 600 divides one frame into two intervals T1 and T2, in order to display images. Interval T1 is divided into first and second display intervals NT1 and NT2, respectively. Likewise, interval T2 is divided into first and second blanking intervals BT1 and BT2, respectively.

In the first display interval NT1, the data driver 600 applies data voltages Vdat to the corresponding data lines $D_1$-$D_m$, and the upper scanning driver 410U sequentially applies scanning signals $VU_1$-$VU_p$ to the scanning signal lines $GU_1$-$GU_p$ of the upper block BLU. As indicated by the arrow of FIG. 9, the scanning direction of the upper block BLU is directed from the uppermost scanning signal line $GU_1$ towards the lowermost scanning signal line $GU_p$. The first switching transistor Qs1 is connected to the scanning signal lines $GU_1$-$GU_p$. Therefore, the voltage Vdat applied to the data lines $D_1$-$D_m$ is applied to the control terminal of the corresponding driving transistor Qd through the corresponding turned-on first switching transistor Qs1. The data voltage Vdat applied to the driving transistor Qd is charged in the capacitor Cst, with the charged voltage being maintained when the first switching transistor Qs1 is turned off. When the data voltage Vdat is applied, the driving transistor Qd turns on to output a current $I_{LD}$ corresponding to the voltage Vdat. As the current $I_{LD}$ flows through the OLED LD, images are displayed on the corresponding pixels PX. During one horizontal period 1H, data driver 500 and scanning driver 400 operate on one row of pixels PX. After the completion of each horizontal period 1H, the data driver 500 and the scanning driver 400 repeat the same operation for the succeeding row of pixels PX. In this manner during the first display interval NT1, the scanning signals $VU_1$-$VU_p$ are sequentially applied to the upper scanning signal lines $GU_1$-$GU_p$, and the data voltage Vdat to the pixels PX of upper half BLU.

During the first blanking interval BT1, which follows, and in response to the reverse bias voltage control signals CONT4 from the signal controller 600, the reverse bias voltage generator 800 applies the reverse bias voltage Vneg to the reverse bias voltage line Ln, which is connected to the pixels PX of the lower block BLD. In response to the switching control signals CONT3 from the signal controller 600, the switching driver 700 applies a switching signal to the switching signal line Ck thereby turning on the second switching transistor Qs2. Therefore, the reverse bias voltage Vneg, applied to the reverse bias voltage line Lg, is applied to the control terminal of the corresponding driving transistor Qd through the corresponding turned-on switching transistor. Desirably, the reverse bias voltage Vneg is an AC voltage as shown in FIGS. 5 and 6, with the aforementioned characteristics of the reverse bias voltage Vneg described with respect to FIG. 5 also being applicable.

During the second display interval NT2, which follows, the data voltage Vdat is applied to the corresponding data lines $D_1$-$D_m$, and the lower scanning driver 410D sequentially applies the scanning signals $VD_1$-$VD_q$ to the scanning signal lines $GD_1$-$GD_q$ of the lower block BLD. Unlike in the first display interval NT1, the scanning direction during this interval is directed from the bottom to the top, as indicated by the arrow of FIG. 9. That is, the scanning proceeds in the lower block BLD from the lowermost scanning signal line $GD_q$ towards the uppermost scanning signal line $GU_p$. Operations performed during the second display interval NT2 are substantially the same as those performed during the first display interval NT1, and the foregoing description can be applicable to interval NT2.

During the second blanking interval BT2, and in response to the reverse bias control signal CONT4 from the signal controller 600, the reverse bias voltage generator 800 substantially continuously applies the reverse bias voltage Vneg to the reverse bias voltage line Ln connected to the upper block BLU. Operations performed during the second display interval BT2 are substantially the same as those performed during the first display interval BT1, and the foregoing description can be applicable to interval BT2.

As described above, while the data voltage Vdat is applied to the pixels of the upper block BLU, the reverse bias voltage Vneg is applied to the pixels of the lower block BLD. Conversely, while the data voltage Vdat is applied to the pixels of the lower block BLD, the reverse bias voltage Vneg is applied to the pixels of the upper block BLU. Therefore, while the pixels of the upper block display images, the pixels of the lower block BLD display black, and vice versa. After the data voltage Vdat is supplied, the pixels PX emit light until the reverse bias voltage Vneg is applied. After the reverse bias voltage Vneg is applied, the pixels PX do not emit until the data voltage Vdat is supplied during the next frame. Accordingly, it is possible to prevent a blurring phenomenon that makes an image unclear and out of focus, and at the same time to prevent a threshold voltage shift. by causing no light to be emitted during a portion of one frame 1FT.

Although the above description has been made with respect to embodiments where the display panel and the scanning driver are divided into two units, and where one frame of a display operation is divided into two intervals for the present invention is not limited thereto. Advantageously, one or both of the display panel and the scanning driver may be divided into three or more units, and a frame for display operation may be divided into three or more intervals.

Figure 11:
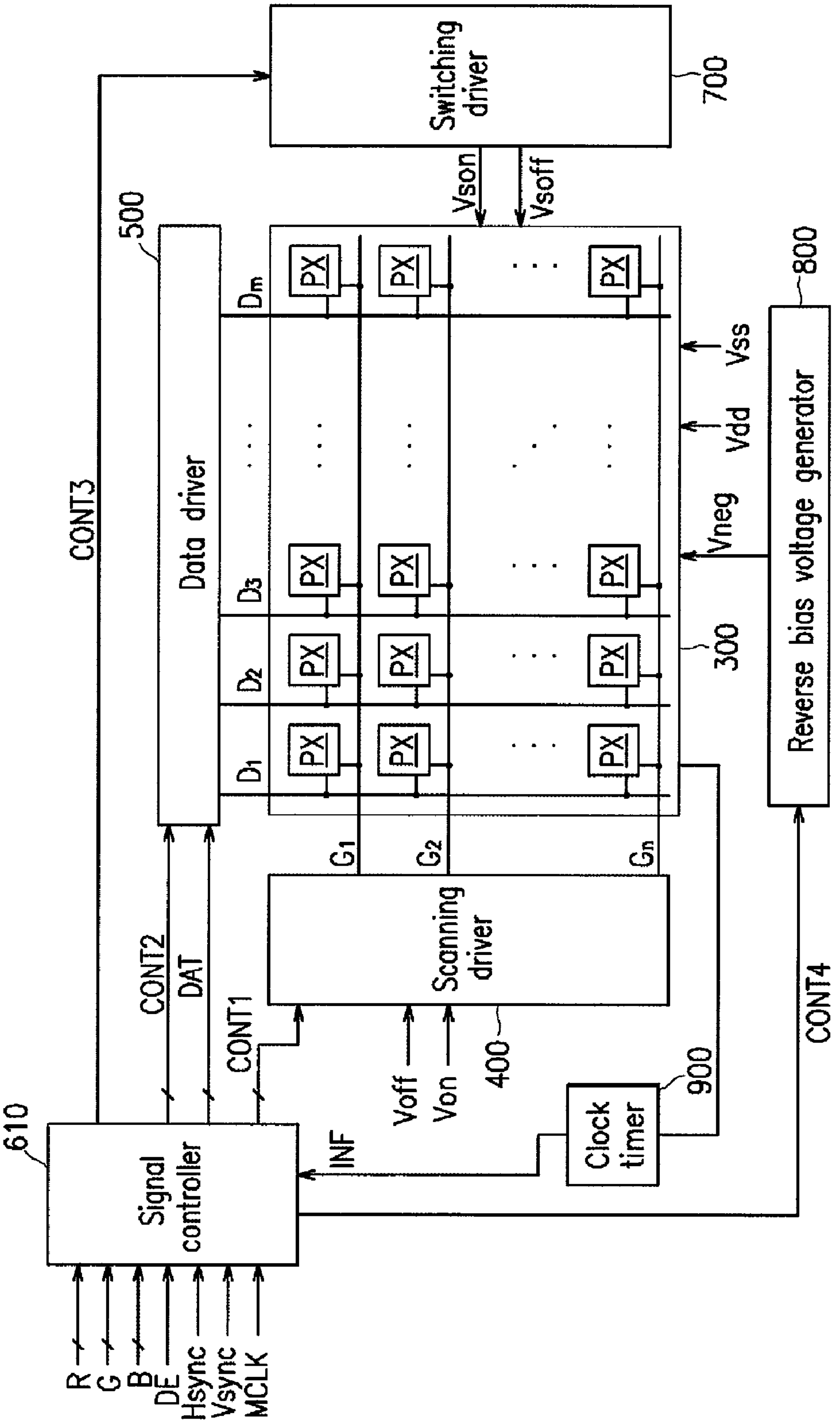
FIG. 11 is a block diagram of an OLED display in accordance with another exemplary embodiment of the present invention.

FIG. 11 illustrates another exemplary OLED display embodiment, in the form of a block diagram. Referring to FIG. 11, The OLED display shown in FIG. 11 includes a display panel 300; a scanning driver 400 and a data driver 500 connected to the display panel 300; a switching driver 700; a reverse bias voltage generator 800; a signal controller 610 for controlling the scanning drivers 400, the data driver 500, the switching driver 700, and the reverse bias voltage generator 800; and a clock timer 900. The clock timer 900 determines whether the power of the OLED display is turned on, measures the turn-on time, and transmits such information INF to the signal controller 610. The signal controller 610 controls the operations of the gate driver 400 and the data driver 500, and receives the turn-on time information INF from the clock timer 900, to control the operation of the switching driver 700 and the reverse bias voltage generator 800. The gate driver 400, the data driver 500, the switching driver 700, and the reverse bias voltage generator 800 are substantially the same as those as shown in FIG. 1, and aforementioned characteristics of the OLED displays described with respect to FIGS. 1 to 4 also may be applied to the OLED display of FIG. 11.

Figure 12:
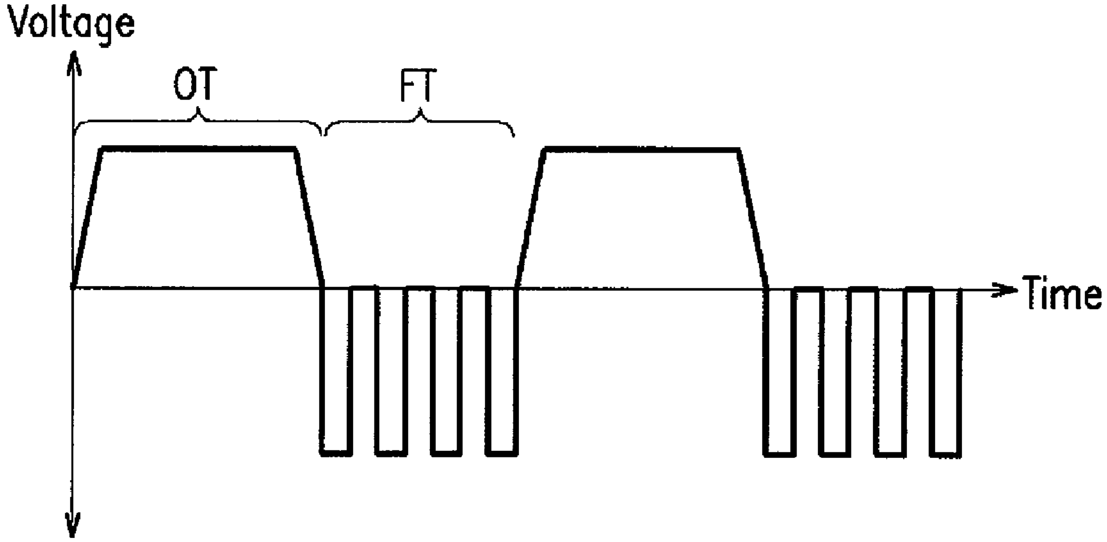
FIG. 12 is a waveform diagram illustrating a voltage applied to a driving transistor of an OLED display in accordance with another exemplary embodiment of the present invention.

FIG. 12 illustrates an OLED display in accordance with yet another embodiment of the present invention. FIG. 12 illustrates a waveform diagram depicting a voltage applied to a driving transistor of an OLED display embodiment. Referring to FIG. 12, the operational period of an OLED display in accordance with the present exemplary embodiment is divided into a turn-on interval OT, during which the power of the display is turned on (i.e., the OLED display is in a turned-on state), and a turn-off interval, during which the power of the display is turned off (i.e., the OLED display is in a turned-off state).

In the turn-on interval OT, the OLED display operates in the same way as in the first interval NT of FIG. 5. That is, the data driver 500 applies the data voltage Vdat to the corresponding data lines $D_1$-$D_m$, and the scanning driver 400 sequentially applies scanning signals to the scanning signal lines, to which are connected to the respective first switching transistor Qs1. Accordingly, when the first switching transistor Qs1 is turned on, the data voltage Vdat applied to the data lines is applied through the corresponding turned-on first switching transistor Qs1 to the control terminal of the corresponding driving transistor Qd. The data voltage Vdat applied to the driving transistor Qd is charged in the capacitor Cst, with the charged voltage being maintained when the first switching transistor Qs1 is turned off. When the data voltage Vdat is applied, the driving transistor Qd is turned on, thereby driving an output current $I_{LD}$ corresponding to the voltage Vdat. Images are displayed on the corresponding pixels PX, as the current $I_{LD}$ flows through the OLED LD.

The display operation is performed when the OLED display is in a turned-on state, as described above. If the OLED display is turned off without being used, and in response to the reverse bias control signal CONT4 from the signal controller 600, the reverse bias voltage generator 800 applies the reverse bias voltage Vneg to the reverse bias voltage line Ln, which is connected to the pixels PX. In response to the switching control signals CONT3 from the signal controller 600, the switching driver 700 applies a switching signal to the switching signal line Ck, thereby turning on the second switching transistor Qs2 to which the switching signal line Ck is connected. Therefore, the reverse bias voltage Vneg is applied by the reverse bias voltage line Lg to the control terminal of the corresponding driving transistor Qd, through the corresponding turned-on switching transistor.

During this time, the clock timer 900 calculates the time during which the OLED display is in a turned-on state, and transmits this information INF to the signal controller 600. In response, the signal controller 600 sets the time for applying the reverse bias voltage Vneg to the control terminal of the driving transistor Qd in accordance with predetermined standards. Also thus determined are the control signals CONT3 and CONT4 to be transmitted to the switching driver 700 and the reverse bias voltage generator 800, respectively. That is, during the display operation of the driving transistor Qd of the OLED display, signal controller 600 measures the application time of the data voltage Vdat and the calculates the appropriate number of hours to apply the reverse bias voltage Vneg, which typically is in proportion to the application time of the data voltage Vdat.

It maybe advantageous that the reverse bias voltage Vneg be applied for about x hours, if the turn-on time of the OLED display is about y hours, where $x \leqq y$. For example, in selected embodiments herein, a desirable value for application of the reverse bias voltage Vneg can be about 1 hour when the corresponding turn-on time of the OLED, e.g., the application time of data voltage Vdat, is about 8 hours. In other words, it may be desirable to provide an application time of the reverse bias voltage that is about ⅛ of the turn-on time of the display device.

As above, if the reverse bias voltage Vneg is applied using the time during which the OLED display is not in use, it is possible to use the OLED display more efficiently while preventing a threshold voltage shift. In accordance with the present invention, it is possible to prevent a shift of the threshold voltage of an amorphous silicon TFT, thereby preventing degradation in picture quality.

While this disclosure of invention has been provided in connection with exemplary embodiments, it is to be understood that the present teachings are not limited to the disclosed embodiments, but, on the contrary, they are intended to cover various modifications and equivalent arrangements included within the spirit and scope of the here provided teachings.

What is claimed is:

1. A display device, comprising:

a light emitting element; and a driving transistor coupled for supplying an emission intensity defining driving current to the light emitting element at time intervals when the light emitting element is to emit light of corresponding intensity, the driving transistor having a first gate, a first source, and a first drain;

a gate controlling circuit coupled to the first gate, the gate controlling circuit having a first switch coupled to selectively apply a supplied data voltage to the first gate, and having a second switch coupled to selectively apply a supplied reverse biasing voltage signal to the first gate;

a reverse bias signal generator coupled to the second switch and operative to supply a time varying voltage signal forming at least part of the supplied reverse biasing voltage signal, where the time varying voltage signal includes a succession of plural voltage pulses each having at least one voltage level that causes the driving transistor to become reverse biased when the second switch is closed and when the at least one, reverse-biasing voltage level is then being supplied by the reverse bias signal generator as part of the reverse biasing voltage signal.

2. The display device of claim 1, wherein:

the first switch includes a first switching transistor connected to the driving transistor and configured to transmit the data voltage in response to a supplied scanning signal; and the second switch includes a second switching transistor connected to the driving transistor, and configured to transmit the reverse biasing voltage signal in response to a supplied switching signal.

3. The display device of claim 1, wherein said reverse biasing voltage signal has an AC component with a corresponding AC frequency and the frequency of the AC component ranges between about 10 Hz to about 10,000 Hz.

4. The display device of claim 1, wherein a duty ratio of the AC component ranges between about 10% to about 90%.

5. The display device of claim 1, wherein the reverse biasing voltage signal includes respective first and second voltage levels that define maximum and minimum voltage values respectively and wherein an average of the maximum value and the minimum value is less than about 0V.

6. The display device of claim 5, wherein the maximum value is about 0V.

7. The display device of claim 5, wherein the maximum value is greater than 0V.

8. The display device of claim 2, further comprising:

a controller operatively coupled to the first and second switches so as to cause the first switching transistor and the second switching transistor to be turned on alternatingly.

9. The display device of claim 8, wherein the turn-on time of the first switching transistor is longer than the turn-on time of the second switching transistor.

10. The display device of claim 9, wherein the ratio of the turn-on time of the first switching transistor to the turn-on time of the second switching transistor ranges between about 4:1 to about 16:1.

11. The display device of claim 1, wherein the gate controlling circuit further comprises a storage capacitor coupled to the first gate and configured to retain a supplied data voltage passed through the first switch and corresponding to a respective, image defining data signal.

12. The display device of claim 1, wherein the gate controlling circuit can be in one of a data acquiring state and a data retaining state, wherein the data voltage is applied to the driving transistor when the gate controlling circuit is in the data acquiring state, and wherein the reverse biasing voltage signal is applied to the driving transistor when the gate controlling circuit is in the data retaining state.

13. The display device of claim 12, further comprising a clock timer configured to determine whether a power supply of the light emitting element (OLED) is turned on, and to measures a turn-on time thereof.

14. The display device of claim 13, wherein the application time of the reverse biasing voltage signal is about ⅛ of the measured turn on time.

15. A display device, comprising:

a first pixel row group;

a first pixel row group switching transistor connected to the first pixel row group;

a first pixel row group driving transistor connected to the first pixel row group switching transistor;

a second pixel row group;

a second pixel row group switching transistor connected to the second pixel row group; and a second pixel row group driving transistor connected to the second pixel row group switching transistor, a first gate driver connected to the first pixel row group switching transistor and configured to transmit a first scanning signal; and a second gate driver connected to the second pixel row group switching transistor and configured to transmit a second scanning signal, wherein each of the first pixel row group and the second pixel row group includes at least one pixel row formed of a plurality of pixels, wherein each pixel includes a light emitting element connected to a respective one of the first pixel row group driving transistor or the second pixel row group driving transistor, wherein during operation, a data voltage is applied to the first pixel row group driving transistor and an AC reverse bias voltage signal is applied to the second pixel row group driving transistor wherein the AC reverse bias voltage signal includes a succession of plural voltage pulses each having a reverse biasing level that causes the first pixel row group driving transistor and the second pixel row group driving transistor to be in reverse biased states when the reverse bias voltage is applied to those driving transistors.

16. The display device of claim 15, wherein the direction of applying the first scanning signal to the first pixel row group is opposite to the direction of applying the second scanning signal to the second pixel row group.

17. The display device of claim 15, wherein the AC reverse bias voltage is applied after the data voltage is applied to the first pixel row group driving transistor, and the data voltage is applied after the AC reverse bias voltage is applied to the second pixel row group driving transistor.

18. The display device of claim 15, wherein one frame is divided into a first interval having a first display interval and a first blanking interval, and a second interval having a second display interval and a second blanking interval, wherein the data voltage is applied to the first pixel row group driving transistor during the first display interval, wherein the AC reverse bias voltage is applied to the second pixel row group driving transistor during the first blanking interval, wherein the data voltage applied to the second pixel row group driving transistor during the second display interval, and wherein the alternating current reverse bias voltage is applied to the first pixel row group driving transistor during the second blanking interval.

19. A method of driving a display device having a light emitting element and a driving transistor supplying current to the light emitting element, the driving transistor having a gate and the method comprising:

applying a data voltage to the gate of the driving transistor during a first interval; and applying a reverse bias voltage signal to the gate of the driving transistor during a second interval, wherein the reverse bias voltage includes an AC voltage component including a succession of plural voltage pulses each having a reverse biasing level that causes the driving transistor to become reverse biased.

20. The method of claim 19, wherein the ratio of the application time of the data voltage to the application time of the reverse bias voltage ranges between about 4:1 to about 16:1.

21. The method of claim 19, wherein a frequency of the AC component of the reverse bias voltage ranges between about 10 Hz to about 10,000 Hz.

22. The method of claim 19, wherein a duty ratio of the AC component of the reverse bias voltage ranges from between about 10% to about 90%.

23. The method of claim 19, wherein the reverse bias voltage is a signal having a maximum value voltage and a minimum value voltage and wherein an average of the maximum value and the minimum value is less than 0V.

24. The method of claim 19, wherein the data voltage is applied to the driving transistor when the display device is in a turned-on state, and the reverse bias voltage is applied to the driving transistor when the display device is in a turned-off state.

25. A method of driving a display device, wherein the display device comprises a plurality of pixels each including: a switching transistor, a driving transistor having a gate where the driving transistor is connected to the switching transistor, the display device further comprising first and a second pixel row groups each connected to respective ones of the switching transistors, the groups including at least one pixel row formed of a plurality of the pixels, with each pixel further having a light emitting element connected to the driving transistor of that pixel, the method of driving the display device, comprising:

applying during a first data application interval, a first data voltage to the first pixel row group;

applying during the first data application interval, an AC reverse bias voltage signal to the second pixel row group where the AC reverse bias voltage signal includes a succession of plural voltage pulses each having at least one voltage level that causes corresponding driving transistors of the second pixel row group to become reverse biased;

applying during a second data application interval, a second data voltage to the second pixel row group; and applying during the second data application interval, the AC reverse bias voltage signal to the first pixel row group to thereby cause corresponding driving transistors of the first pixel row group to become reverse biased during the second data application interval.

* * * * *